United States Patent
Odell et al.

(10) Patent No.: US 6,207,002 B1
(45) Date of Patent: Mar. 27, 2001

(54) RESIN IMPREGNATION OF ABSORBENT MATERIAL

(75) Inventors: Clinton Kelly Odell; Patrick J. Anderson, both of Salem, OR (US)

(73) Assignee: Gelco Services, Inc., Salem, OR (US)

( * ) Notice: Subject to any disclaimer, the term of this patent is extended or adjusted under 35 U.S.C. 154(b) by 0 days.

(21) Appl. No.: 09/302,910

(22) Filed: Apr. 30, 1999

(51) Int. Cl.[7] .................................................. B05D 7/22
(52) U.S. Cl. ................................. 156/287; 427/238
(58) Field of Search ............................ 156/286, 287, 156/382; 427/230, 238, 294; 264/269, 134, 512, 553; 141/65

(56) References Cited

U.S. PATENT DOCUMENTS

| 3,494,813 | 2/1970 | Lawrence et al. | 156/287 |
|---|---|---|---|
| 4,182,262 | 1/1980 | Everson et al. | 118/44 |
| 4,366,012 | 12/1982 | Wood | 156/93 |
| 5,348,764 | 9/1994 | Yokoshima | 427/140 |
| 5,354,586 | 10/1994 | Yokoshima et al. | 428/36.1 |
| 5,699,838 | 12/1997 | Catallo et al. | 141/65 |
| 5,794,663 | 8/1998 | Kiest, Jr. et al. | 138/98 |
| 5,846,602 | * 12/1998 | Henze | 427/238 |

* cited by examiner

Primary Examiner—Michael W. Ball
Assistant Examiner—John T. Haran
(74) Attorney, Agent, or Firm—Chernoff, Vilhauer, McClung & Stenzel, LLP

(57) ABSTRACT

A method and apparatus for use in impregnating an absorbent fibrous layer or similar portion of a tubular liner with a curable resin material to prepare such a liner for installation into a pipe to repair the pipe. Several vacuum applicators such as hollow needles, all connected to a vacuum, are used simultaneously to evacuate air from the entire absorbent fibrous layer of the tubular liner, beginning at a time significantly before curable resin is first introduced to be absorbed. A timer is used to begin the evacuation automatically.

6 Claims, 2 Drawing Sheets

RESIN IMPREGNATION OF ABSORBENT MATERIAL

BACKGROUND OF THE INVENTION

The present invention relates to resin impregnation of absorbent lining materials to be used in the repair of damaged underground pipes and passageway walls, and relates particularly to insuring that curable resin material is thoroughly and efficiently distributed in such absorbent lining materials.

Damaged pipes, particularly large underground pipes, can be repaired by installation of reinforcing linings much more quickly and at much lesser expense than by removing and replacing the pipes, especially where such pipes are located beneath city streets and buildings. Even though such linings within repaired pipes will slightly reduce the interior volume of the repaired pipes, the interior surfaces of such linings are smoother than those of old cracked or corroded pipe walls and the flow capacity of repaired pipes often is greater than the capacity of the original pipes before such repair.

The process of installing a liner including an absorbent layer and a layer of a resin-impermeable film to repair pipes and passageways is explained in general terms in Wood, U.S. Pat. No. 4,366,012. Typically, a fibrous, absorbent layer of a tubular liner is impregnated with curable resin material under conditions in which the resin does not begin to cure, and curing is initiated only after the liner has been installed in the pipe being repaired. Once the impregnation of the absorbent portion of the liner with a resin has been accomplished, however, it is difficult or impossible to detect and correct inadequately impregnated portions of the liner material. Thus, it is very important not to leave air in the absorbent material of a liner where such air might remain and prevent the resin from permeating the liner material.

The manner of impregnating an absorbent portion of a liner with a curable resin material as taught in the Wood patent, however, suffers from serious shortcomings, particularly with respect to liners for pipes such as large sewer conduits. Wood teaches the resin-impregnation of the absorbent layer of a liner being prepared for installation by forming a hole in the impermeable film and applying a cup to the film, and then applying a vacuum to the liner through the cup. A first portion of the liner is evacuated in that way, and curable resin is then forced into the absorbent material of that portion of the liner by a mechanism such as a pair of rollers applying pressure to the liner to move a quantity of resin through the interior of the liner along its length. A further portion of the liner is evacuated, in turn, by moving the suction cup to another hole in the film.

Such a progressive evacuation is undesirably time-consuming, and such a cup is not particularly reliable in maintaining a tight seal to create a vacuum within a tubular liner being prepared for installation.

It is also known to use one or more hollow tubular needles, inserted through the resin-impermeable layer of a tubular liner as a pathway for removal of air from the interior of the liner so that its absorbent layer can be impregnated with a curable resin, as taught in Catallo, et al., U.S. Pat. No. 5,699,838. In a multiple-needle process of evacuating such a tubular liner in order to impregnate its absorbent portions a small number of such needles are used serially to puncture the resin-impermeable film and evacuate air from an absorbent layer of only a portion of a liner tube closely ahead of a quantity of curable resin being moved along and urged into the absorbent wall material of the liner.

Everson, et al., U.S. Pat. No. 4,182,262 describes a process which is probably even less efficient in evacuating the liner to promote absorption of a curable resin material, since a vacuum is applied only at an opposite end of a tubular liner from the location where resin material is introduced.

All of the known prior art methods thus provide only time consuming and inefficient evacuation and resin impregnation of the absorbent material of a liner for use in repair of a pipe, as such methods have been used to evacuate the absorbent material of a liner tube only during the process of installation of resin in the absorbent material of the liner. What is needed, then, is an improved method, and apparatus for use in accordance with such a method, for efficiently evacuating and impregnating a tubular liner with curable resin to prepare such a liner to be installed to repair damaged or deteriorated pipes and conduits.

SUMMARY OF THE INVENTION

The present invention provides an answer to the aforementioned shortcomings of the prior art by providing apparatus and an improved method for efficiently impregnating with an curable resin a resin-absorbent material included as part of a flexible liner tube.

In accordance with one embodiment of the method of the invention, resin absorbent material of such a flexible liner tube is impregnated with a curable resin by closing both ends of the tube, inserting a plurality of vacuum applicators through an outer membrane of the liner at respective locations spaced apart from each other along the tube, applying a vacuum to the interior of the tube through all of the plurality of vacuum applicators simultaneously, thereafter inserting a predetermined amount of resin into the interior of the tube at one end, and while continuing to apply vacuum to each of said vacuum applicators, beginning at or near one end of the tube, squeezing a portion of the resin toward the opposite end of the tube, and as the resin approaches one of the vacuum applicators removing that one of the vacuum applicators and resealing the membrane of the tube.

In accordance with one aspect with the method, the application of a vacuum to the interior of the tube is commenced automatically at a predetermined time before placement of a quantity of a resin into the interior of the tube.

The present invention also provides a combination of apparatus including a vacuum source, a vacuum conduit interconnected with the vacuum source, a plurality of flexible secondary vacuum conduits, vacuum applicators each interconnected with a respective one of the secondary vacuum conduits, and a timer operatively connected with the vacuum source to cause the vacuum source to begin to apply a vacuum to the vacuum conduit at a predetermined time.

In an apparatus which is one embodiment of the invention, a cutoff valve is included in each secondary vacuum conduit.

In one embodiment of the invention the vacuum applicators are hollow needles each having a sharpened, open outer end.

By applying a vacuum to the interior of a tube at a time prior to the time when it is intended to insert a curable resin into an absorbent layer of the tube, and by evacuating the tube along its entire length, by the simultaneous use of vacuum applicators installed at locations spaced apart along substantially the entire length of the tube to be impregnated with a curable resin, the present invention provides for a more efficient, speedier, and more effective impregnation of the absorbent layer with curable resin.

The foregoing and other objectives, features, and advantages of the invention will be more readily understood upon

DETAILED DESCRIPTION OF THE PREFERRED EMBODIMENTS

Figure 1:
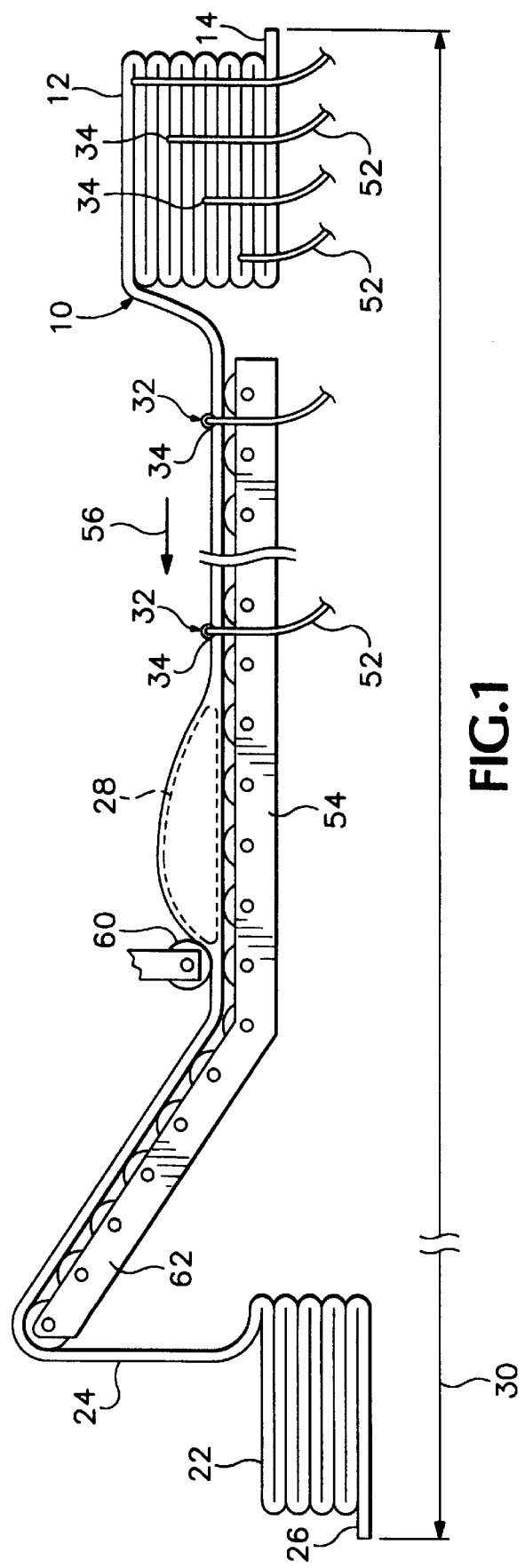
FIG. 1 is a simplified side elevational view of a long tubular liner for a pipe, together with apparatus for impregnating an absorbent part of the liner with a curable resin material according to the present invention.

Referring to the drawings which form a part of the disclosure herein, in FIG. 1 a length of a tubular liner 10 to be used to repair a damaged pipe is shown in side view, where a portion of the liner 10 is folded back and forth upon itself in a stack 12, which may be conveniently supported, as upon a pallet (not shown) to be transported. An end 14 of the tubular liner 10 extends from the bottom of the stack 12.

Such a liner 10 is typically manufactured as required for a specific planned installation, so that the liner 10 will fit smoothly against the interior of a pipe to be repaired by installation of such a liner. The liner 10 includes one or more layers 16 of absorbent fibrous material such as a needle felt or cloth made of flexible strong fibers. The material of the layer 16 is cut and fashioned into a tube of the required length, circumference, and wall thickness. The layer 16 is then covered by an adherent layer 18 such as a film or membrane of a flexible plastic material which is substantially airtight. In this status the liner 10 is dry and flexible and can be transported and stored until the pipe to be repaired is ready for the liner 10 to be installed.

The portion of the liner 10 which is in the stack 12 consists of the layer 16 and the outer layer 18, which may be, for example, a layer of polyurethane sprayed onto the surfaces of the felt layer 16 as a membrane about 0.25 mm (0.010") thick, covering the exterior of the felt layer 16.

A second stack 22 includes a portion 24 of the liner whose layer 16 of felt or other absorbent material has been impregnated with a curable resin 28 according to the present method. A first end 26 of the liner 10 is shown at the bottom of the second stack 22.

Figure 2:
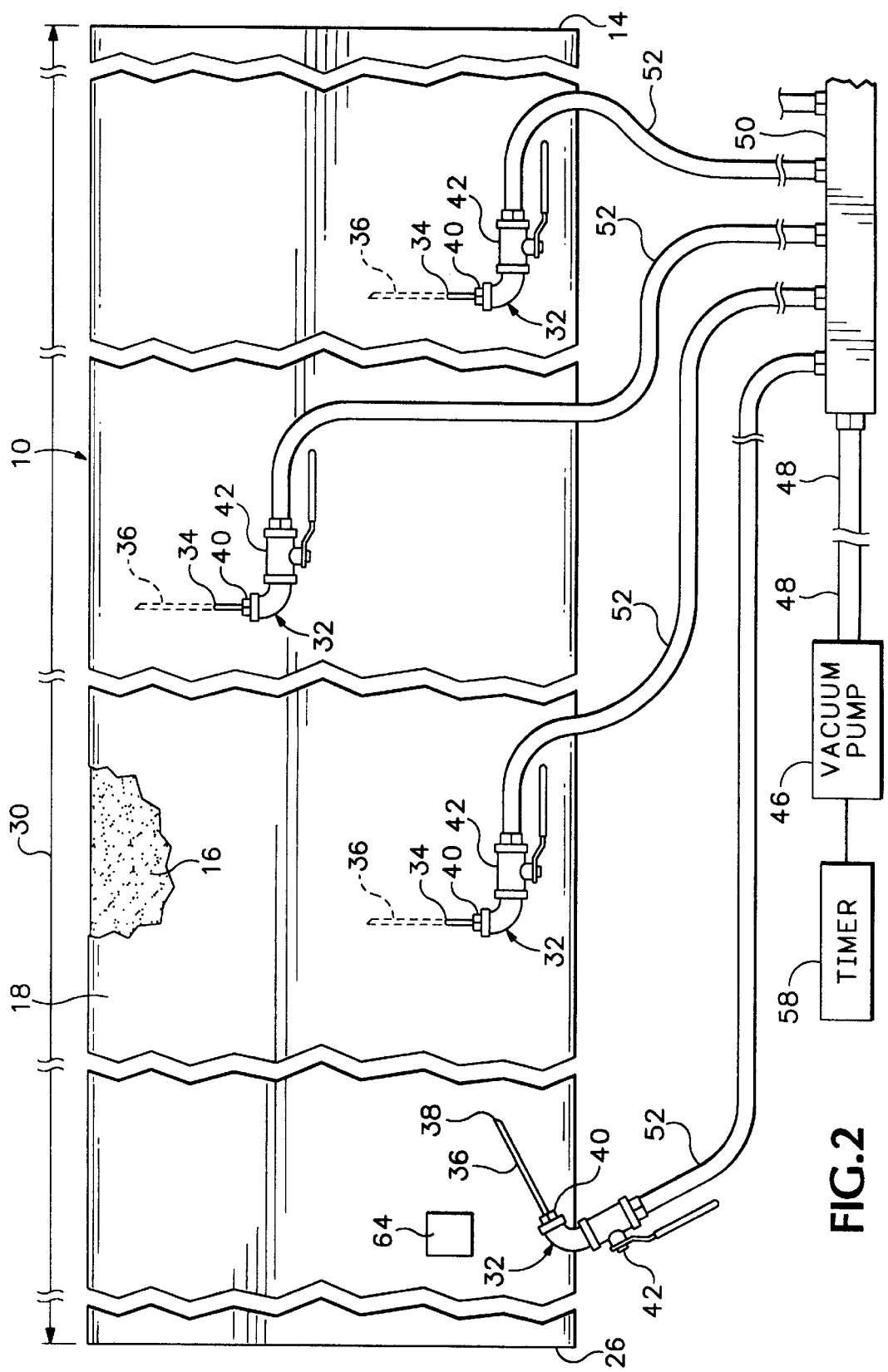
FIG. 2 is a simplified top plan view of a portion of the liner shown in FIG. 1, together with exemplary apparatus embodying the present invention, for evacuating air from within the liner as a part of the process of impregnating the liner with a curable resin.

Before the liner 10 is installed in a pipe to repair it, the absorbent layer 16 is impregnated with a curable fluid synthetic resin 28, of which a quantity is shown within the liner 10 in FIG. 2. The curable resin 28 which is ordinarily used to impregnate the absorbent layer 16 is a thermosetting resin preferably thoroughly covering, surrounding, and adhering to the fibers of which the layer 16 is made, so that when the resin 28 sets the resin-impregnated absorbent layer becomes a strong, hard layer of fiber-reinforced resin.

According to the method of the present invention, before the curable resin 28 is inserted into the layer 16, the air is evacuated from the interior of substantially all of the liner 10 between the ends 26 and 14, so that a significantly reduced pressure is present within the liner 10, and particularly within the absorbent fibrous layer 16. The interior of the liner 10 is substantially evacuated so that a quantity of resin 28 can flow freely into all of the interstices between the fibers of the layer 16 of felt, without being blocked from flowing into the material of the layer 16 by pockets of air contained within the liner 10.

The evacuation of the liner 10 is accomplished by closing the ends 26 and 14 and then applying a vacuum to the interior of the liner 10, using several vacuum applicators 32 installed at multiple locations 34, separated from one another along the length 30 of the liner 10 and communicating with the interior of the liner 10.

While the vacuum applicators 32 may be of various types, such as, for example, the apparatus described in Catallo, et al., U.S. Pat. No. 5,699,838, a preferred vacuum applicator 32 is a simple hollow needle 36, shown in FIG. 2. Such a hollow needle 36 may be of tubular material, beveled to provide a sharpened end 38 including an opening communicating with the hollow interior of the needle 36. The sharpened end 38 can be used easily to pierce the plastic outer layer 18 of the liner 10 so that the needle 36 extends into the interior of the liner 10. A base of the needle 36 is fastened as shown at 40, to a suitable fitting connected to a cutoff valve 42.

The needles 36 may, for example, be made of suitable stainless steel tubing, such as that commonly used in automotive hydraulic brake lines, with an inside diameter of 4.76 mm (3/16"). Preferably, the outer end 38 of each needle 36 is beveled at an angle of 30° to provide a sharp cutting edge, so that insertion of the needle through the layer 18 can be accomplished directly by forcing the needle 36 through the plastic outer layer 18 and the layer 16 of absorbent material into the interior of the tubular liner 10.

A vacuum pump 46, which may have an associated vacuum reservoir (not shown) is connected through a vacuum conduit 48 to a manifold 50, and several secondary vacuum conduits 52 are connected with the manifold 50. The manifold 50 may include connections for as large a number of connections for secondary vacuum conduits 52 as desired, and while they are not shown, it will be understood that individual valves for the secondary vacuum conduits 52 could be associated closely with the manifold 50.

Each secondary vacuum conduit 52 is a flexible vacuum hose of ample length to extend from the manifold 50 to the liner 10 while it rests in the stack 12 awaiting preparation for installation into a pipe to be repair. Each secondary vacuum conduit 52 must also be of ample length for the respective associated vacuum applicator 32 to be moved, along with the liner 10, as the liner is moved along a conveyor 54, as shown in FIG. 1, in the direction indicated by the arrow 56. The vacuum pump 46 should be capable of drawing at least a sufficient vacuum, and should be of ample capacity, to reduce pressure to an absolute pressure of about 23" of mercury, or less, within the liner 10 intended to be prepared for installation.

A timer 58 is associated with the vacuum pump 46 to initiate operation of the vacuum pump 46 at a predetermined time. That is, the timer 58 may be set to start operation of the vacuum pump 46 at a particular time, for example three hours prior to the beginning of a normal workday on which it is intended to prepare the liner 10 for installation.

In preparing to impregnate the liner 10 with a curable resin 28, the ends 26 and 14 of the liner 10 are closed, and the needles 36 or other vacuum applicators 32 are installed into the liner 10 at locations 34 spaced apart from each other by a distance such as a few feet, along the entire length 30 of the liner 10 to be prepared. For example, the needles 36 could be spaced apart from each other by a distance of 15–20 feet along a liner 10 to be used in a pipe 305 mm (12") to 380 mm (15") in diameter. For a liner 10 of larger size it would be preferred to place the needles 36 closer together along the length 30 of such a liner 10.

The evacuation of the interior of the liner 10, along the entire length 30 thereof, at a time prior to installation of the quantity of resin 28 into the interior of the liner 10 at the first end 26 makes it unnecessary to wait during the process of spreading and absorption of the curable resin into the absorbent layer of felt 16 while a vacuum cup or needle is moved to a location 34 further from the pressure rollers 60, and furthermore makes it unnecessary to await evacuation of a portion of the liner 10 further from the rollers 60 after such a vacuum applicator is placed, as was necessary using the methods known in the prior art.

Since each needle 36 is of relatively small size, as it punctures the outer layer 18 of plastic of the liner 10 the plastic material of the layer 18 attempts elastically to grip the exterior surfaces of the needle 36 quite closely, so that leakage around the needle 36 as the liner 10 is evacuated is insignificant. With the needles 36 installed in the liner 10 the cutoff valves 42 are opened, so that the interior of each needle 36 communicates with the interior of the respective secondary vacuum conduit 52, and thence through the manifold 50 to the vacuum pump 46.

The timer 58 is set to start the vacuum pump at a predetermined time, for example, 5:00 a.m. on the morning on which it is intended to prepare the liner 10 for installation. By the time the normal workday commences several hours later, evacuation of the liner 10 along its entire length 30 is substantially complete. When the time arrives to impregnate the liner 10 with curable resin 28, the available end 26 of the liner 10 is carried from the stack 12 onto the conveyor 54, along which it is extended toward the pair of pinch rollers 60. A calculated quantity of curable fluid resin 28 is prepared as required for impregnation of the absorbent layer 16 of the liner 10. The end 26 is then opened as necessary, and the appropriate quantity of the resin 28 is inserted, while operation of the vacuum pump 46 continues to remove any air from the interior of the liner 10.

The end 26 is then re-closed and led between the rollers 60 and thence up the discharge end 62 of the conveyor 54. As the liner 10 is moved between the rollers 60, the curable resin 28, in a fluid state, is forced into and absorbed by the fibrous absorbent layer 16, and unabsorbed excess resin 28 is squeezed further along the interior of the liner 10 toward the stack 12. As the liner 10 moves along the conveyor 54 the impregnated portion 24 is carried from the discharge end 62 of the conveyor and formed into the stack 22.

As the liner 10 moves along the conveyor 54 toward the rollers 60, each location 34 where a vacuum applicator 32 is present approaches the quantity of unabsorbed curable resin 28. In order to ensure that the resin 28 is not sucked into the needles 36 and vacuum conduits 52, as the resin 28 approaches each location 34 the respective cutoff valve 42 is closed as the needle 36 is withdrawn from the liner 10, and the resultant opening in the layer 18 is closed. Preferably, this is accomplished by attaching to the layer 18 a small patch 64 of a similar plastic material such as a polyurethane sheet material having a thickness of about 0.25 mm (0.010"), as by the use of a readily available chemical solvent to weld the patch to the layer 18.

The needle 36 shown at the left end of FIG. 2 has thus been withdrawn from the liner 10 and a patch 64 is in place closing and sealing the needle hole in the layer 18.

The remaining needles 36, at their respective locations 34, continue to be effective in maintaining a vacuum within the remaining portion of the liner 10, in the stack 12 and extending along the conveyor 54, until the resin 28 has been spread into and has impregnated the layer 16 of felt or other absorbent material along the entire length 30 of the liner 10 to its end 14. As the liner 10 in turn progresses along the conveyor 54, each of the cutoff valves 42 is closed and each needle 36 is removed in turn as the respective location 34 approaches the resin 28.

Once the entire length 30 of the liner 10 has been impregnated with the curable resin 28, the impregnated liner 10, as is well known, will be kept under suitable refrigeration to prevent the resin from beginning to cure before the liner 10 is properly installed in the pipe or other conduit which it is intended to repair.

It will be understood that various types of timers 58 may be appropriate with respect to the particular vacuum pump 46 available, and that, depending upon the size of the liner 10, different lengths of time will be required for evacuation of the liner 10 prior to the installation of curable resin 28 in the liner 10 to thoroughly impregnate the absorbent layer 16.

It will also be understood that, providing a sufficiently large vacuum reservoir is available, the timer 58 may also be used to control operation of a suitable remotely controllable valve (not shown) as the equivalent to initiating operation of the vacuum pump 46. In light of the foregoing disclosure, it will be appreciated that the present invention provides an improved method for preparing a liner 10 for thorough and efficient impregnation of an absorbent layer 16 with a curable resin 28.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of impregnating with a curable resin a quantity of resin-absorbent material included as part of an elongate flexible tube, said flexible tube having a pair of opposite ends and a length and an outer layer including an air-impermeable membrane disposed about said resin-absorbent material, the method comprising the steps of:

(a) closing both of said opposite ends of said flexible tube;

(b) inserting a plurality of vacuum applicators through said air-impermeable membrane at respective locations spaced apart from each other along substantially all of said length of said flexible tube;

(c) connecting each of said vacuum applicators to a vacuum source;

(d) applying a vacuum from said vacuum source through all of said plurality of vacuum applicators simultaneously for a sufficient time to evacuate air from substantially the entire length of said flexible tube;

(e) thereafter, inserting within said flexible tube at a first one of said ends a predetermined amount of said curable resin; and (f) beginning at or near said first end, passing said flexible tube between squeezing members and forcing a portion of said resin to flow towards the other of said ends as said flexible tube passes between said squeezing members.

2. The method of claim 1, including the further steps of continuing to apply said vacuum to each of said plurality of vacuum applicators while forcing said portion of said resin to flow, and, as said resin approaches one of said vacuum applicators, removing that one of said vacuum applicators and sealing said air-impermeable membrane where said vacuum applicator had previously been inserted.

3. The method of claim 1, including the steps of connecting each vacuum applicator separately to said vacuum source through a flexible conduit including a respective valve and closing said respective valve upon removal of each vacuum applicator from said flexible tube.

4. The method of claim 1 wherein said vacuum applicators are hollow needles.

5. The method of claim 1, including performing the step of inserting said plurality of vacuum applicators at a first time earlier than a scheduled time for commencement of impregnating said resin absorbent material, and thereafter automatically beginning to apply vacuum through said vacuum applicators at least a predetermined amount of time prior to said scheduled time.

6. The method of claim 1, including the further step of continuing to apply vacuum to each of said plurality of vacuum applicators that remains inserted in said flexible tube, so long as any of said plurality of vacuum applicators remains inserted in said flexible tube.

\* \* \* \* \*